United States Patent [19]

Invernizzi et al.

[11] 4,204,981

[45] May 27, 1980

[54] SUPPORTED CATALYSTS FOR THE HOMO- AND CO-POLYMERIZATION OF α-OLEFINES

[75] Inventors: Renzo Invernizzi, Milan; Ferdinando Ligorati, Usmate; Maurizio Fontanesi, Concorezzo, all of Italy

[73] Assignee: Euteco S.p.A., Milan, Italy

[21] Appl. No.: 947,229

[22] Filed: Sep. 29, 1978

[30] Foreign Application Priority Data

Sep. 30, 1977 [IT] Italy .................................. 28133 A/77

[51] Int. Cl.² .......................... C08F 4/02; C08F 4/64
[52] U.S. Cl. .......................... 252/429 B; 252/429 C; 252/431 R; 526/114; 526/115; 526/122; 526/124; 526/125; 526/159
[58] Field of Search ........... 252/429 B, 429 C, 431 R, 252/429 R

[56] References Cited

U.S. PATENT DOCUMENTS

| | | | |
|---|---|---|---|
| 3,642,746 | 2/1972 | Kashiwa et al. | 252/429 C X |
| 3,658,722 | 4/1972 | Delbouille et al. | 252/431 R X |
| 3,897,364 | 7/1975 | Colombo et al. | 252/429 C |
| 4,006,101 | 2/1977 | Matsuura et al. | 252/429 R X |
| 4,105,585 | 8/1978 | Matheson | 252/429 B |

*Primary Examiner*—Patrick Garvin
*Attorney, Agent, or Firm*—Sughrue, Rothwell, Mion, Zinn and Macpeak

[57] ABSTRACT

Ziegler catalytic system for the polymerization of olefins, formed by the combination of an organo-metallic compound and a compound of a heavy metal supported on a carrier.

The carrier is an active complex obtained by reacting one or more alloys of metals chosen from Mg, Fe, Al, Ni, Cr and Zn, gaseous hydrogen chloride and one or more alcohols in the liquid or gaseous state, at a temperature of from 60° to 300° C., the said active complex having a content of free alcoholic hydroxyl groups of from 1 to 20% by weight, a chlorine content of from 15 to 70% by weight, a metal content of from 5 to 35% by weight, a porosity of from 0.1 to 1 cc/g and a surface area of from 1 to 200 m²/g.

21 Claims, No Drawings

SUPPORTED CATALYSTS FOR THE HOMO- AND CO-POLYMERIZATION OF α-OLEFINES

The present invention relates to Ziegler catalytic systems particularly suitable for the homo- and co-polymerization, at low pressure, of α-olefins.

It is known that in similar processes the catalytic system generally consists of a Ziegler catalytic system formed by the combination of a transition metal compound and an organo-metallic compound.

It is also known that the transition metal compound may be fixed to a support, such as for example $Al_2O_3$, an aluminosilicate, $SiO_2$, MgO, $MgCO_3$ or $Mg(OH)_2$. Processes of this type have, however, the considerable disadvantage of generally requiring a final washing of the polymers to purify the products obtained of harmful residues of the catalytic system.

It is also known that halogenation (generally fluorination) of supports such as for example $Al_2O_3$, $SiO_2$, MgO or $SiO_2$. $Al_2O_3$ results in a considerable increase in the activity of the catalytic system, such that it becomes possible to avoid the costly operation of the final washing of the polymer, as is described, for example, in the British Pat. Nos. 1,314,784 and 1,315,770.

These catalysts do not, however, allow a simple regulation of the average molecular weight of the polymer. The polymers generally have a very high average molecular weight and a Melt Index (measured by the ASTM D1238 method, with a weight of 2.16 Kg) very close to zero. Therefore they are often difficult to process.

We have now found a support for the transition metal compound of the Ziegler catalytic system, which allows the coupling of the advantages, and the elimination of the disadvantages, of both types of catalysts which have been indicated above; there is thus obtained:

(a) high catalytic activity in the polymerization at low pressures (about 5 $Kg/cm^2$) and hence productivity such, that it is possible to avoid any washing of the polymers obtained;

(b) easy controllability of the average molecular weight and the Melt Index of the polymers, and also of their crystallinity and density.

Moreover, the process for obtaining the active complex which will be used as the support is very simple and efficient and results in a support which does not require those conventional activation treatments which are usually carried out before contacting the support with the transition metal compound.

This support permits also, thanks to its accentuated activity and to its excellent state of subdivision, only the strictly stoichiometric quantity of the compound of a heavy metal of group IV up to group VI to be used in the preparation of the catalytic component, whereas an excess of this compound is usually used in the known art.

The invention provides a Ziegler catalytic system formed by the combination of an organo-metallic compound of a metal of Group I, II or III of the Periodic System of the Elements according to Mendeleef and a compound of a heavy metal of Group IV, V or VI of said Periodic System supported on a carrier, characterized in that the carrier is an active complex obtained by reacting one or more metal alloys each consisting of two or more metals chosen from Mg, Fe, Al, Ni, Cr and Zn, gaseous hydrogen chloride and one or more aliphatic, cycloaliphatic, aromatic or alkylaromatic alcohols in the liquid or gaseous state, at a temperature of from 60° to 300° C., the said active complex having:

(a) a content of free alcoholic hydroxyl groups of from 1 to 20% by weight;
(b) a chlorine content of from 15 to 70% by weight;
(c) a metal content of from 5 to 35% by weight;
(d) a porosity of from 0.1 to 1 cc/g; and
(e) a surface area of from 1 to 200 $m^2/g$.

The metal alloys may be used in the form of a powder, filings, turnings, etc. The hydrogen chloride may be either pure or mixed with inert gases such as $H_2$, $N_2$ and He. The alcohols may be in the liquid state or in the form of vapours. The different types of metal alloys mentioned above give completely satisfactory results. However, the aluminium-magnesium alloys are generally preferred.

The fact must be underlined that the simultaneous presence of two (or more) metals favours the obtaining of optimal properties in the complex produced, thanks to a synergic effect.

It must also be noted that a wide range of alcohols is usable for the reaction. Good results have been obtained, for example, with methyl, ethyl, propyl, amyl and benzyl alcohols or with phenols and cresols. Ethyl alcohol and the branched aliphatic alcohols, in particular isopropyl alcohol, are preferable.

It must be noted, moreover, that with a suitable choice of the alcohol, the obtaining of optimal values of the porosity of the complexes produced may be favoured.

The reaction between the aforesaid reagents occurs rapidly and may be carried out as well in the liquid phase as in the gaseous (or dry) phase (that is using the alcohol vapours).

If the reaction is carried out in the liquid phase, there may be added an inert diluent such as, for example, an anhydrous aliphatic, cycloaliphatic, aromatic or alkylaromatic hydrocarbon (less than 5 ppm of water) having a boiling point greater than or equal to that of the alcohol used. Examples of such hydrocarbons are hexane, heptane, cyclohexane, toluene, xylene etc. Heptane and cyclohexane are preferable.

It must be underlined that by choosing the reaction parameters suitably there may be obtained active complexes with the desired characteristics, that is to say the desired percentage by weight of free alcoholic OH groups, of chlorine, of metals and the desired porosity and surface area.

Since both the specific activity of the final catalytic system (expressed as Kg of polymer obtained/gram of transition metal/hour/atmosphere of olefin) and also the properties of the polymers produced, (such as average molecular weight, Melt Index, crystallinity, specific density, etc.), depend on the total of these characteristics of the support it is clear that the reaction conditions for the preparation of the support will, from time to time, be chosen in dependence on the characteristics which it is desired to obtain in the final products.

The best values for the chemical and physical characteristics of the active complex are within the following intervals:

free alcoholic hydroxyl group content of from 1 to 20% by weight (and preferably 3 to 10% by weight);

chlorine content of from 15% to 70% by weight (and preferably from 30% to 60% by weight);

metal content of from 5% to 35% by weight (and preferably from 10% to 25% by weight);

porosity of from 0.1 to 1 cc/g (and preferably from 0.3 to 0.7 cc/g);

surface area of from 1 to 200 m²/g (and preferably from 5 to 100 m²/g).

From this it results that the values usable for the main reaction parameters also lie within relatively wide ranges. The ratio between equivalents of metal and moles of alcoholis generally from 1:0.5 to 1:20, and preferably from 1:1 to 1:10.

When the reaction is carried out in the liquid phase, the quantity of hydrogen chloride used is preferably such as to saturate the liquid reaction phase.

When the reaction is carried out in the gaseous phase, the hydrogen chloride/alcohol (as vapour) molar ratio is generally from 0.5:1 to 10:1, and preferably from 1:1 to 5:1.

The range of values of the reaction times usable is relatively wide. These may vary from 15 to 250 minutes and preferably from 30 to 100 minutes.

The reaction temperatures are very important in that these influence the basic characteristics of the active complex which is obtained, such as the percentage of free alcohol groups, the porosity and the surface area, as well as the crystalline structure in a marked manner.

Also depending on the type of alcohol used, the temperature may vary from 60° to 300°, and preferably from 80° to 200° C.

Reaction temperatures greater than 200° C. generally result in too low concentrations of the free alcohol groups in the active complexes obtained, which then have low catalytic activity.

The reaction pressures do not constitute a critical factor, even when the reaction is carried out in the gaseous phase.

It must finally be indicated that, while in the preparation in the gaseous phase, the reaction conditions are chosen so as to obtain the crystalline active complex directly in its final state (solid and dry), in the preparation under "wet conditions", the operating conditions chosen for isolating the active complex produced in the final state (solid and dry) have a considerable influence on its chemical and physical characteristics.

In particular, the time, the pressure and the temperature of evaporations of the volatile components determine, in a substantial manner, the crystalline structure, the grain size, the porosity and the surface area of the active complex.

Therefore, in the preparation under wet conditions, the removal from the active complex produced of the excess alcohol, and possible diluents, is advantageously carried out by using an evaporation temperature of from 100° to 200° and preferably from 130° to 180° C., a pressure of from 1 atmosphere to 100 mm Hg and a time of from 1 to 10 hours, and preferably from 4 to 8 hours.

The catalytic system is then prepared by reaction of the support described above with a compound of a heavy metal of group IV to group VI of the periodic system, and by subsequent activation of the catalytic component thus formed by treatment with an organo-metallic compound of a metal from group I to group III of the periodic system.

The compounds of the heavy metals are preferably chosen from the halides, the oxyhalides, the alkoxyhalides and the alcoholates. The preferred heavy metals are titanium, vanadium and chromium.

Hence, for example, suitable compounds are $TiCl_4$, $TiBr_4$, $VDl_4$, $VOCl_3$, $VOBr_3$, $CrO_2Cl_2$, $Ti(OC_2H_5)_3Cl$, $Ti(O\ isoC_4H_9)_2Cl_2$, $Ti(OC_2H_5)_4$, $Ti(O\ isoC_4H_9)_4$, etc. The best results are obtained with $TiCl_4$.

The reaction between the support and the heavy metal compound is carried out under the usual conditions described in the art. It must be noted, as already indicated, that the support allows the strictly stoichiometric quantity of the heavy metal compound with respect to the said support to be used.

Finally, the organometallic compounds may be chosen from the metal-alkyls, the halides or the hydrides of metal-alkyls, or even the Grignard compounds. These metals may be chosen, for example, from Al, Zn, Mg, Na and Li.

Suitable compounds are thus, for example, $Al(CH_3)_3$, $Al(C_2H_5)_3$, $Al(isoC_4H_9)_3$, $Li(C_4H_9)$, $Al(C_2H_5)_2Cl$, $Al(C_2H_5)_2$ Br, $Al(C_2H_5)_2H$, $Al(isoC_4H_9)_2H$, $Al_2(C_2H_5)_3Cl_3$, $(C_2H_5)MgBr$, etc. The best results are generally obtained with the aluminium-alkyls and the halides or the hydrides of aluminum-alkyls, and especially with aluminium-triethyl and aluminium-tri-isobutyl.

The catalytic system which is the subject of the present invention is applicable to the homo- or co-polymerization of the α-olefins, and especially of ethylene or propylene. The homo- or co-polymerization of the olefins may be carried out by any of the usual methods, both in the gaseous phase and in solution.

The regulation of the average molecular weight of the polymer which it is desired to obtain can be achieved, as well as by means of suitable choice of the support, prepared according to the invention, also by means of the addition of one or more of the usual chain terminating agents, such as hydrogen, alcohols, $CO_2$, zinc-alkyls and cadmium-alkyls.

The polymers obtained, and especially the polyethylene produced, are substantially linear and typically have a Melt Index of from 0.1 to 20, a crystallinity of from 50% to 84% and a density of from 0.95 to 0.97. Since the Melt Index may vary within an extremely wide range of values, these products are suitable practically for any type of processing, such as, for example extrusion, blow-moulding etc.

Several examples will be given hereinafter purely for illustrative purposes. These must not be considered as a limitation of the invention. In the Examples the Melt Index was determined by the ASTM D1238 method, with a weight of 2.16 Kg, if not otherwise indicated.

EXAMPLE 1

10 g of a Mg—Al alloy powder, containing 90.8% by weight of Mg and 8.5% by weight of Al (as well as impurities of Mn (0.2%) and Zn (0.5%)) are loaded into a tubular glass reactor (jacketed and furnished with an agitator) having a porous septum at the bottom. The reactor is first dried at 140° C. with anhydrous nitrogen and this temperature is then maintained during the reaction.

There is then introduced at the bottom, through the porous septum, a gaseous mixture of HCl/ethyl alcohol in a molar ratio of 1:1 and with a feed rate of HCl of 20 l/h.

After 4 hours a powder having a grain size of from 10 to 100 microns, a surface area of 50 m²/g, a porosity of 0.53 cc/g and a content of $C_2H_5OH$ groups of 19% by weight is obtained.

10 g of this powder are treated with 100 cc of anhydrous n-heptane containing 2 cc of $TiCl_4$ for 4 hours at ambient temperature. Then this is filtered and dried for 1 hour at 136° C.

A catalytic component is obtained containing 3.5% by weight of Ti, 64% by weight of $Cl_2$, 21% by weight of Mg and 2% by weight of Al.

45 mg of this catalytic component are dispersed in two liters of anhydrous n-heptane containing 0.2 cc of aluminium-triethyl and the whole is poured into a 4 liter, steel autoclave furnished with an agitator. Polymerization of ethylene is then carried out at a temperature of 90° C. and at a total pressure of 5 $Kg/cm^2$ (4 $Kg/cm^2$ of ethylene and 1 $Kg/cm^2$ of hydrogen) for a period of 30 minutes.

500 grams of polymer are obtained. The output is 5555 grams of polyethylene/g catalyst/hour/atmosphere of ethylene. The specific activity of the catalyst is 158.5 Kg of polyethylene/g of Ti/h/atmosphere of ethylene.

The polymer obtained has a Melt Index of 0.2 and a crystallinity of 70%.

EXAMPLE 2

In this Example the preparation of the catalytic support is carried out by a "wet" process, rather than a "dry" process.

10 g of powder of the same alloy as in Example 1 are treated in a glass reactor, furnished with an agitator and dehydrated at elevated temperature with anhydrous $N_2$, with 100 cc of anhydrous ethyl alcohol and with gaseous HCl (feed rate of 20 l/h) at reflux temperature for 60 minutes. Evaporation is then carried out for 4 hours, at 130° C. and at atmospheric pressure, thus obtaining a powder having a grain size of from 30 to 80 microns and with a content of $C_2H_5OH$ groups of 24% by weight.

10 g of this powder are treated with 100 cc of anhydrous n-heptane containing 1 cc of $TiCl_4$ for 4 hours at reflux temperature and drying is then carried out as in Example 1. A catalytic component is obtained containing 3% by weight of Ti, 61% by weight of $Cl_2$, 22% by weight of Mg and 2% by weight of Al.

80 mg of this catalytic component are disperded in two liters of anhydrous n-heptane containing 0.2 cc of aluminium-triethyl and the polymerization of ethylene is carried out as in Example 1.

720 g of polymer are obtained. The output is 4,500 g of polyethylene/g catalyst/hour/atmosphere of ethylene. The specific activity of the catalyst is 150.0 Kg of polyethylene/g of Ti/hour/atmosphere of ethylene.

The polymer obtained has a Melt Index of 0.21 and a crystallinity of 71%.

EXAMPLE 3

This control example is given to show that by operating under conditions such as to obtain an active complex almost free from alcoholic OH, the activity of the final catalyst obtained is greatly reduced.

The support is prepared as in Example 1, but using a temperature of 310° C. After 4 hours of reaction a powder is obtained which has a content of $C_2H_5OH$ groups less than 1% by weight.

10 g of this powder are treated with $TiCl_4$ as described in Example 1, thus obtaining a catalytic component containing 0.8% by weight of Ti, 74% by weight of $Cl_2$, 23% by weight of Mg and 2.1% by weight of Al.

50 mg of this catalytic component are dispersed in two liters of anhydrous n-heptane containing 0.2 cc of aluminium-triethyl and the polymerization of ethylene is carried out as in Example 1, but with a reaction time of 1 hour.

45 g of polymer are obtained. The output is 225 g of polyethylene/g catalyst/hour/atmosphere of ethylene and the specific activity of the catalyst is 28.1 Kg of polyethylene/g of Ti/hour/atmosphere of ethylene.

The polymer obtained has a Melt Index of 0.04 and a crystallinity of 55%.

EXAMPLE 4

This test is carried out as in Example 2 except that, in the preparation of the active complex, the evaporation is carried out at 180° C. (still for 4 hours and at atmospheric pressure). The powder thus obtained has a content of $C_2H_5OH$ groups of 13% by weight.

10 g of this powder are treated with $TiCl_4$ as in Example 2, thus obtaining a catalytic component containing 1.5% by weight of Ti, 70% by weight of $Cl_2$, 22% by weight of Mg and 2% by weight of Al.

70 mg of this catalytic component are disperded in two liters of anhydrous n-heptane containing 0.2 cc of aluminium-triethyl and the polymerization of ethylene is carried out as in Example 1.

300 g of polymer are obtained. The output is 2143g of polyethylene/g catalyst/hour/atmosphere of ethylene. The specific activity of the catalyst is 142.8 Kg of polyethylene/g of Ti/hour/atmosphere of ethylene.

The polymer obtained has a Melt Index of 0.1 and a crystallinity of 69%.

EXAMPLE 5

10 grams of powder of a Mg-Al alloy containing 88.9% by weight of Mg and 10% weight of Al (as well as impurities of Mn (0.1%) and Zn (1%)) are treated as in Example 1 but using a ternary gaseous mixture of HCl/ethyl alcohol/$H_2$ in a molar ratio of 1:1:1 and a feed rate of HCl of 20 l/h.

The powder thus obtained has a grain size of from 10 to 110 microns, a porosity of 0.6 cc/g and a content of $C_2H_5OH$ groups of 15% by weight.

10 g of this powder are treated with $TiCl_4$ as in Example 1, thus obtaining a catalytic component containing 2% by weight of Ti and 58% by weight of $Cl_2$.

40 mg of this catalytic component are dispersed in two liters of anhydrous n-heptane containing 0.2 cc of aluminium-triisobutyl and the polymerization of ethylene is carried out as in Example 1.

The output is 3422 g of polyethylene/g catalyst/hour/atmosphere of ethylene, and the specific activity of the catalyst is 171.1 Kg of polyethylene/g of Ti/hour/atmosphere of ethylene.

The polymer obtained has a Melt Index of about 0.1 and a crystallinity of 65%.

EXAMPLE 6

100 mg of the catalytic component prepared in Example 5 are used, together with 0.2 cc of $AlClEt_2$, to polymerize 2 liters of liquid propylene in the autoclave of Example 1.

The reaction is carried out at 60° C., for a period of 1 hour. 213 grams of polymer are obtained. The output is 2130 g of polypropylene/g catalyst/hour. The specific activity of the catalyst is 106.5 Kg of polypropylene/gram of Ti/hour.

The polymer obtained has a Melt Flow Index of 0.7 and a Modulus G 60' at 100° C. of 850.

EXAMPLE 7

10 grams of powder of an alloy containing 30% of Mg and 70% of Al are treated as in Example 1.

An active complex is obtained, in powder form, which has a content of $C_2H_5OH$ groups of 14% by weight and a porosity of 1.0 cc/g.

10 g of this powder are treated with $TiCl_4$ as in Example 1, thus obtaining a catalytic component containing 1% by weight of Ti.

60 mg of this catalytic component are dispersed in two liters of anhydrous n-heptane containing 0.2 cc of aluminium-triethyl and the polymerization of ethylene is carried out as in Example 1, but with a reaction time of 1 hour.

180 g of polymer are obtained. The output is 750 g of polyethylene/g catalyst/hour/atmosphere of ethylene. The specific activity of the catalyst is 75 Kg of polyethylene/g of Ti/hour/atmosphere of ethylene.

The polymer obtained has a Melt Index of 4 (measured according to the ASTM D1238 method, with a weight of 21.6 Kg).

EXAMPLE 8

Two runs are carried out as in Example 1 except that, rather than using 0.2 cc of aluminium-triethyl, there are used respectively:
In Case A: 0.2 cc of diethylaluminium monochloride;
In Case B: 0.2 cc of aluminium-triisobutyl.
The results thus obtained are respectively:
In Case A:
output of 3828 g of polyethylene/g catalyst/hour/atmosphere of ethylene;
specific activity of 109.3 Kg of polyethylene/g of Ti/hour/atmosphere of ethylene.
In Case B:
output of 6380 g polyethylene/g catalyst/hour/atmosphere of ethylene.
specific activity of 182.2 Kg of polyethylene/g of Ti/hour/atmosphere of ethylene.
The polymers obtained have respectively a Melt Index of 0.1 (Case A) and 0.19 (Case B).

EXAMPLE 9

Three runs are carried out as in Example 1 except that, rather than using 2 cc of $TiCl_4$ in 100 cc of anhydrous n-heptane, there are used respectively:
In Case A: 100 cc of a solution containing 25% by weight of $TiCl_2 (OC_4H_9)_2$ in anhydrous n-heptane; In case B: 100 cc of a solution containing 25% by weight of $VOCl_3$ in anhydrous n-heptane; In Case C: 100 cc of a solution containing 25% by weight of $CrO_2Cl_2$ in $CCl_4$.
The three catalytic components obtained contain respectively:
In Case A: 2.1% by weight of Ti; In Case B: 2.7% by weight of V; In Case C: 1.4% by weight of Cr.
The three final catalysts, obtained by activation with aluminium-triethyl according to the procedure of Example 1, yield the following results:
In Case A:
output of 1841 g of polyethylene/g catalyst/hour/atmosphere of ethylene;
specific activity of 87.6 Kg of polyethylene/g of Ti/hour/atmosphere of ethylene;
In Case B:
output of 2215 g of polyethylene/g catalyst/hour/atmosphere of ethylene;
specific activity of 82.0 Kg of polyethylene/g of V/h/atmosphere of ethylene;
In Case C:
output of 1495 g polyethylene/g catalyst/hour/atmosphere of ethylene;
specific activity of 106.7 Kg of polyethylene/g of Cr/h/atmosphere of ethylene.

EXAMPLE 10

This test is carried out as in Example 1, except that the polymerization is carried out at the same total pressure but with different partial pressures of the ethylene (2 $Kg/cm^2$) and of the hydrogen (3 $Kg/cm^2$).

205 g of polymer are obtained. The output is 4555 g of polyethylene/g catalyst/hour/atmosphere of ethylene and the specific activity of the catalyst is 130.1 Kg of polyethylene/g of Ti/hour/atmosphere of ethylene.

The polymer obtained has a Melt Index of 10.

We claim:

1. In a Ziegler catalytic system formed by the combination of an organo-metallic compound of a metal of Group I, II or III of the Periodic System of the Elements according to Mendeleef and a compound of a heavy metal of Group IV, V or VI of said Periodic System supported on a carrier, the improvement which comprises said carrier being an active complex obtained by reacting (i) one or more metal alloys each consisting of two or more metals selected from the group consisting of Mg, Fe, Al, Ni, Cr and Zn, (ii) gaseous hydrogen chloride and (iii) one or more aliphatic, cycloaliphatic, aromatic or alkylaromatic alcohols in the liquid or gaseous state, at a temperature of from 60° to 300° C., said active complex having:
    (a) a content of free alcoholic hydroxyl groups of from 1 to 20% by weight;
    (b) a chlorine content of from 15 to 70% by weight;
    (c) a metal content of from 5 to 35% by weight;
    (d) a porosity of from 0.1 to 1 cc/g; and
    (e) a surface area of from 1 to 200 $m^2/g$.

2. The catalytic system of claim 1, wherein the carrier has a content of free alcoholic hydroxyl groups of from 3 to 10% by weight, a chlorine content of from 30 to 60% by weight, a metal content of from 10 to 25% by weight, a porosity of from 0.3 to 0.7 cc/g and a surface area of from 5 to 100 $m^2/g$.

3. The catalytic system of claim 1, wherein said active complex is prepared by using a ratio of from 1:0.5 to 1:20 between the equivalents of said metals and the moles of alcohol.

4. The catalytic system of claim 3, wherein said ratio is from 1:1 to 1:10.

5. The catalytic system of claim 1, wherein the active complex is prepared in the gaseous phase by maintaining a molar ratio of from 0.5:1 to 10:1 between hydrogen chloride and gaseous alcohol.

6. The catalytic system of claim 5, wherein said molar ratio is from 1:1 to 5:1.

7. The catalytic system of claim 1, wherein said active complex is prepared in the liquid phase with a quantity of hydrogen chloride such as to saturate said liquid phase.

8. The catalytic system of claim 7, wherein said liquid phase contains an inert liquid diluent selected from the group consisting of aliphatic, cycloaliphatic, aromatic and alkylaromatic hydrocarbons.

9. The catalytic system of claim 7, wherein said phase contains an inert liquid diluent selected from the group consisting of heptane and cyclohexane.

10. The catalytic system of claim 7, wherein the active complex is separated from the liquid phase by evaporating the latter at a temperature of from 100° to 200° C., at a pressure of from 1 Atmosphere to 100 mm Hg and for a period of from 1 to 10 hours.

11. The catalytic system of claim 1, wherein said alcohols are selected from the group consisting of methyl, ethyl, propyl, amyl and benzyl alcohols, phenols and cresols.

12. The catalytic system of claim 1, wherein said alcohols are selected from the group consisting of ethyl and isopropyl alcohols.

13. The catalytic system of claim 1, wherein said gaseous hydrogen chloride is used in the form of a mixture with one or more inert gases.

14. The catalytic system of claim 13, wherein hydrogen is used as an inert gas.

15. The catalytic system of claim 1, wherein said active complex is prepared at a temperature of from 80° to 200° C.

16. The catalytic system of claim 1, wherein said alloys, hydrogen chloride and alcohols are reacted for a period of from 15 to 250 minutes.

17. The catalytic system of claim 1, wherein said heavy metal is selected from the group consisting of titanium, vanadium and chromium.

18. The catalytic system of claim 1, wherein said compound of a heavy metal is selected from the group consisting of the halides, the oxyhalides, the alkoxyhalides and the alcoholates.

19. The catalytic system of claim 1, wherein said organo-metallic compound is selected from the group consisting of aluminum-alkyls, halides of an aluminum-alkyl and hydrides of an aluminum-alkyl.

20. The catalytic system of claim 1, wherein said organo-metallic compound is selected from the group consisting of aluminum-triethyl and aluminum-triisobutyl.

21. The catalytic system of claim 1, wherein said compound of a heavy metal is titanium tetrachloride.

* * * * *